UNITED STATES PATENT OFFICE.

CARLETON ELLIS, OF MONTCLAIR, NEW JERSEY.

SET-ADJUSTING CEMENT-WATERPROOFING COMPOUND.

1,099,974. Specification of Letters Patent. Patented June 16, 1914.

No Drawing. Application filed August 6, 1912. Serial No. 713,565.

*To all whom it may concern:*

Be it known that I, CARLETON ELLIS, a citizen of the United States, and a resident of Montclair, in the county of Essex and State of New Jersey, have invented certain new and useful Improvements in Set-Adjusting Cement-Waterproofing Compounds, of which the following is a specification.

This invention relates to a composition for water-proofing cement and concrete, and relates in particular to compositions comprising a water-proofing set-retarding compound, and a set-accelerating body, the latter preferably proportioned with respect to the degree of set-retardation brought about by the water-proofing body, all as more fully hereinafter described and as claimed.

It has been customary heretofore to water-proof concrete by means of additions to the mortar or dry cement of water insoluble soaps, such as the stearates, oleates and palmitates of lime, magnesia, zinc and the like. These insoluble soaps have the disadvantage that they retard the setting of the concrete, and as it often happens that it is essential in laying water-proofed concrete to have a rapid-setting cement, owing to the danger of destruction of the work by percolation, the use of such water-insoluble soaps has caused many difficulties in constructional work, as well as vexatious delays.

The present invention has for its object the production of a composition which is an effective water-proofing agent, and which is at the same time without visible action on the set, or which permits cement to set in substantially normal time. This is accomplished by combining a water-proofing agent normally of a set-retarding character and a set-accelerating compound preferably proportioned to accelerate the set in a degree equivalent to the degree of retardation of the water-proofing compound *per se;* whereby no visible action on the set becomes necessarily apparent.

As a set-accelerating compound I prefer to use a water-soluble salt of a basic character or basic tendency, such as sodium aluminate, potassium pyrophosphate, a mixture of sodium oxalate and sodium carbonate and the like. Calcium and barium chlorid may be used, but in particular I prefer to use sodium aluminate. Alkali carbonates, such as carbonate of sodia, are positive catalysts, and thus accelerate the setting of cement. The alkali carbonates are much more powerful positively than the calcium sulfate is negatively. The addition of 1/100 of 1% of soduium carbonate in one case accelerates the set from six and one half hours to 20 minutes. The alkali carbonates have, however, some action upon the cement which is not wholly beneficial, and while they may be used in the present invention, they are not desirable ordinarily, and therefore not to be recommended. I prefer to use a different class of components comprising such bodies as sodium aluminate, because of the accelerating action of the alumina radical through its combination in some way with the lime of the cement in conjunction with the positive catalysis induced by the soda ion.

As a water-proofing agent I preferably make use of calcium stearate especially in conjunction with certain basic compounds of acid sludge or acid oil waste of petroleum refineries, including the various sulfonic, sulfinic and other acid bodies, which are chemically and physically quite different from the class of bodies known as the fatty acids. The naphthenic acids, under which term these various sulfo-acids and oxidized acids are herein comprised and denominated form the main organic acid constituents of acid sludge. Other constituents of the sludge are unchanged or slightly changed oily matter and sulfurous acid; although the sludge varies with different localities and different oils so that each lot of the sludge should be tested for composition, prior to using as described herein. The sludge from light oils, such as kerosene and naphthas may be used for certain purposes but preferably I employ that derived from the refining of the heavier oils, as these, generally speaking, have a more pronounced water-proofing effect. In preparing the composition set forth herein I usually first separate, as far as possible, the water and the sulfurous acid which may be present and I then neutralize or partially neutralize the organic acid bodies with a base which forms an insoluble compound. Practically, I over-neutralize the acid, that is, add an excess of the basic material so that the resulting composition is essentially basic and carries the basic salts of the acids referred to. This yields a compound which is better adapted for the present purpose than a strictly neutral salt. It is however, undesirable to introduce any great excess of the basic element, but rather if filling or extending materials are required, to use such bodies as talc or fullers' earth and the like. Portland cement is a useful extending material to assist in securing a desirable degree of pulverulency, and in fact, cement may be used as a neutralizing agent. Suitable bases for neutralizing the acid sludge are the oxids (or other basic compounds), of barium, magnesia, lime, alum, iron, lead, zinc and the like. Preferably a composite body derived by neutralizing with burnt dolomite which gives the lime-magnesia compound of acid sludge is used.

The following formula illustrates the combination of a naphthenic acid compound with a fatty acid compound; to wit:—Three parts of barium naphthenate are mixed with one part of lime stearate and one-fourth part of sodium oxalate; two parts of magnesium hydrate are then added. Or equal parts of acid sludge and stearic acid are mixed with a like weight of hydrated lime. The mixture is heated to about 200° C. or thereabout with constant stirring to give a pulverulent product. This is incorporated while still warm with about one half its weight of sodium aluminate. Such mixtures containing the salts of both naphthenic and stearic acid, oleic acid or like body are useful with certain cement aggregates and especially with white Portland cement. When stearic acid, or similar fatty acid is combined in this manner with lime in the presence of the naphthenic acid apparently a complex is derived which incorporates more readily in the mortar than the compounds taken singly. This often is desirable especially in the case of some mortar mixtures in which a simple lime soap such as lime stearate segregates from the wet mixture to a considerable extent. The method of forming the basic bodies in the presence of filling and weighting material, causes, in a large measure, the attachment of the water-proofing compounds to the filling material, from which they are not readily dislodged by the action of the water in making mortar; hence, each of the particles may be thus weighted with a particle of the heavier material which also tends to prevent undesirable flotation.

A composition suitable for ordinary Portland cement concrete is made by mixing three parts of calcium stearate with a mixture composed of equal parts of dry powdered sodium aluminate, and hydrated lime. In the manufacture of ordinary calcium stearate for making the well known lime soap water-proofing compounds, the stearic formula involves using about 3 pounds of hydrated lime to 1 pound of stearic acid. As this amount of stearic acid requires, for complete combination, a half pound or less of hydrated lime, it will be seen that there is a considerable excess of the lime. The latter has no essential water-proofing qualities unless used in very much larger proportion than applied in this formula. Enough hydrated lime, must however, be present to enable the stearate to be reduced to a fine powder by grinding. Too high a proportion of stearic acid makes the grinding operation difficult. This formula has been tried out so extensively in the trade that the proportion required,—namely 2% on the neat cement, is definitely established. The introduction of any water-proofing compound calling for more than 2% of the material used in this way would be objectionable owing to such a well established practice. In the present invention it has been found possible to displace a portion of the hydrated lime by the aluminate of soda or other set-accelerating compound, and thus enable the 2% basis to obtain, while securing a compound having no visible set-modifying action on concrete. A suitable formula based on this method of compounding, involves combining 1½ parts of lime with 1 part of stearic acid, and incorporating while the mixture is still warm from the heat of reaction or otherwise, about 1½ parts of sodium aluminate. The material is then allowed to cool, when it is ground and bolted to produce a fine powder. In this composition sufficient lime is present to form a basic stearate, and a sufficient quantity of set-accelerating material is present to properly adjust the set.

From the foregoing description and details of preparation of various compositions under the present invention, it will be noted that the present waterproofing compound of a set-adjusting character is essentially and substantially free from grease and excess fat, glycerin and other hygroscopic liquids, and is therefore capable of remaining in the form of a fine non-caking powder having the property of readily incorporating and distributing itself throughout a body of dried cement when it is mixed therewith.

This application contains certain matter disclosed in my co-pending application Serial No. 675,216 filed Feb. 3, 1912.

What I claim is:—

1. A water-proofing composition comprising basic calcium stearate and sodium aluminate.

2. A waterproofing composition comprising calcium stearate and a coöperating set-accelerating body in regulated amount, so that set-retardation is substantially equilibrated by set-acceleration, said composition being substantially free from fatty grease and excess fat, glycerin and other hygroscopic bodies, and being capable under attrition of reduction to a fine powder, and when exposed to atmospheric moisture of remaining in the form of a fine non-caking powder readily distributing with dry cement.

3. A water-proofing composition comprising stearate of lime containing an excess of lime in admixture with sodium aluminate, the proportion of stearic acid in combination with lime, in the composition being approximately 25% of the total lime content.

4. A waterproofing composition comprising basic calcium stearate and a coöperating alkaline set-accelerating compound; the proportion of the latter being adjusted with respect to the former, so that set-retardation is equilibrated by set-acceleration, said composition being substantially free from fatty grease and excess fat, glycerin and other hygroscopic substances, and being capable under attritition of reduction to a fine powder, and when exposed to atmospheric moisture of remaining in the form of a fine non-caking pulverulent material readily mixing with dry cement.

Signed at Montclair in the county of Essex and State of New Jersey this 3rd day of August A. D. 1912.

CARLETON ELLIS.

Witnesses:
A. H. NEY,
A. A. WELLS.